US009109396B2

(12) United States Patent
William

(10) Patent No.: US 9,109,396 B2
(45) Date of Patent: Aug. 18, 2015

(54) LADDER HAVING NARROW BASE

(71) Applicant: Frame William, Parkesburg, PA (US)

(72) Inventor: Frame William, Parkesburg, PA (US)

(73) Assignee: Ballymore Company, Inc., Parkesburg, PA (US)

( * ) Notice: Subject to any disclaimer, the term of this patent is extended or adjusted under 35 U.S.C. 154(b) by 0 days.

(21) Appl. No.: 13/974,616

(22) Filed: Aug. 23, 2013

(65) Prior Publication Data

US 2014/0076660 A1    Mar. 20, 2014

Related U.S. Application Data

(60) Provisional application No. 61/693,105, filed on Aug. 24, 2012.

(51) Int. Cl.
*E06C 1/397* (2006.01)
*B64F 1/315* (2006.01)
*E04G 1/24* (2006.01)
*E06C 7/18* (2006.01)

(52) U.S. Cl.
CPC ............... *E06C 1/397* (2013.01); *B64F 1/315* (2013.01); *E04G 1/24* (2013.01); *E06C 7/182* (2013.01); *E06C 7/183* (2013.01)

(58) Field of Classification Search
CPC ............ E06C 1/397; E06C 1/39; E06C 1/14; E06C 1/24; E04G 1/24; B64F 1/315
USPC .......................................... 182/15, 17, 180.2
See application file for complete search history.

(56) References Cited

U.S. PATENT DOCUMENTS

| | | | | | |
|---|---|---|---|---|---|
| 826,582 | A | * | 7/1906 | Laird | 182/124 |
| 2,624,590 | A | * | 1/1953 | Tilton | 280/43.14 |
| 2,798,652 | A | * | 7/1957 | Easton | 182/17 |
| 2,923,373 | A | * | 2/1960 | Ledgerwood | 182/102 |
| 3,112,010 | A | * | 11/1963 | Mihalik | 182/106 |
| 3,155,190 | A | * | 11/1964 | Borgman | 182/15 |
| 3,291,254 | A | * | 12/1966 | Mihalik | 182/15 |
| 3,357,741 | A | * | 12/1967 | Vadner | 297/447.4 |
| 3,684,055 | A | * | 8/1972 | Rice | 182/17 |
| 3,731,947 | A | * | 5/1973 | Fontaine | 280/641 |
| 4,044,857 | A | * | 8/1977 | Guerette | 182/17 |
| 4,768,617 | A | * | 9/1988 | Mason et al. | 182/1 |
| 5,111,907 | A | * | 5/1992 | Kishi | 182/69.4 |
| 5,411,111 | A | * | 5/1995 | Greve | 182/17 |
| 5,791,434 | A | * | 8/1998 | Swiderski | 182/17 |
| 5,941,341 | A | * | 8/1999 | Gillis et al. | 182/17 |
| 6,216,818 | B1 | * | 4/2001 | Moffat | 182/17 |
| 6,305,496 | B1 | * | 10/2001 | Bieszczad | 182/15 |
| 6,523,640 | B1 | * | 2/2003 | Young et al. | 182/17 |

(Continued)

FOREIGN PATENT DOCUMENTS

GB          1123182    *  8/1968  ............. E04G 1/24
WO    WO 9627729 A2  *  9/1996  ............. E06C 1/397

*Primary Examiner* — Colleen M Chavchavadze
(74) *Attorney, Agent, or Firm* — Kenneth DeRosa; Law Offices of Robert F. Zielinski LLC

(57) ABSTRACT

A ladder includes a stair section having a plurality of steps, a vertical upright that connects to a top of the stair section, a base that connects a bottom of the stair section and a bottom of the vertical upright, and one or more wheels connected to the bottom of the vertical upright. The ladder may also include a front locking step and a rear wheel assembly. A narrow base extends between a step of the stair section above a bottom step or locking step and the vertical upright.

8 Claims, 4 Drawing Sheets

(56) References Cited

U.S. PATENT DOCUMENTS

| | | | |
|---|---|---|---|
| 6,951,265 B2 * | 10/2005 | Frame et al. | 182/152 |
| 7,048,091 B1 * | 5/2006 | Maguire | 182/33 |
| 2008/0093166 A1 * | 4/2008 | Frolik et al. | 182/17 |
| 2008/0217103 A1 * | 9/2008 | Pucek | 182/15 |

* cited by examiner

LADDER HAVING NARROW BASE

This application claims the benefit of U.S. provisional application No. 61/693,105 filed on Aug. 24, 2012, whose entire disclosure is hereby incorporated by reference.

BACKGROUND

1. Field

The invention relates to ladders, especially rolling ladders to be used where mobility and turning space is limited.

2. Background

In warehouses, department stores, and the like, where space is limited, such as where there are narrow aisles; it is difficult to use conventional rolling ladders because it is difficult to move the ladder between ladders due to the large bases of these ladders. The present invention overcomes these limitations by providing a ladder having a base that is narrower than existing rolling ladders.

The above references are incorporated by reference herein where appropriate for appropriate teachings of additional or alternative details, features and/or technical background.

SUMMARY

A ladder includes a stair section having a plurality of steps, a vertical upright that connects to a top of the stair section, a base that connects a bottom of the stair section and a bottom of the vertical upright, and one or more wheels connected to the bottom of the vertical upright. The ladder may also include a front locking step and a rear wheel assembly. A narrow base extends between a step of the stair section above a bottom step or locking step and the vertical upright.

The base may include an elongated member located on about the centerline of the ladder. The elongated base member may comprise a rectangular assembly connected together. The elongated base member may connect to the second step of the stair assembly and extends substantially horizontally toward the rear of the ladder. The elongated base member may have a width of no more than six inches.

BRIEF DESCRIPTION OF THE DRAWINGS

The embodiments will be described in detail with reference to the following drawings in which like reference numerals refer to like elements wherein.

DETAILED DESCRIPTION

Figure 1:
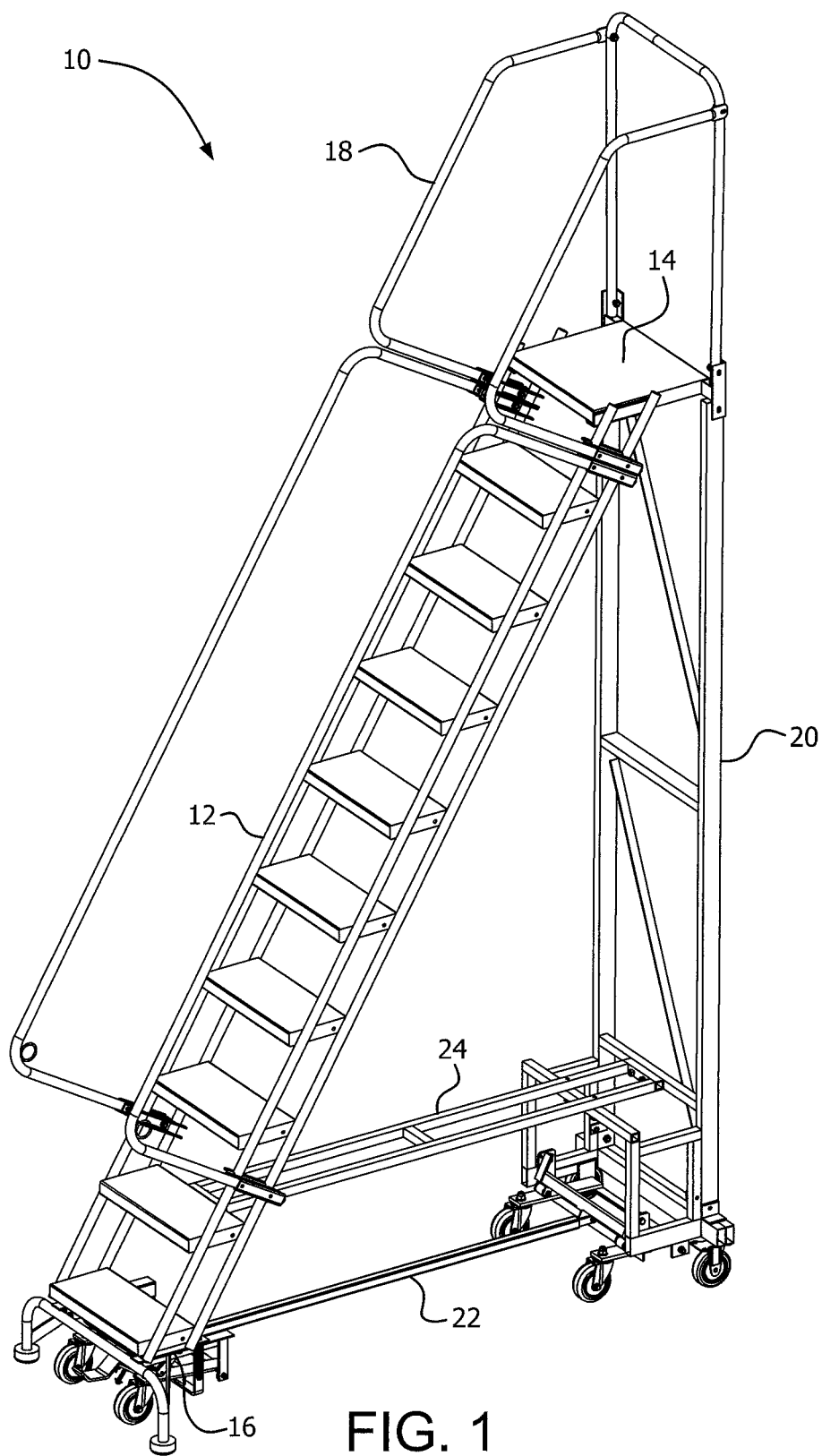
FIG. 1 shows a front isometric view of the ladder of the present invention.
Figure 2:
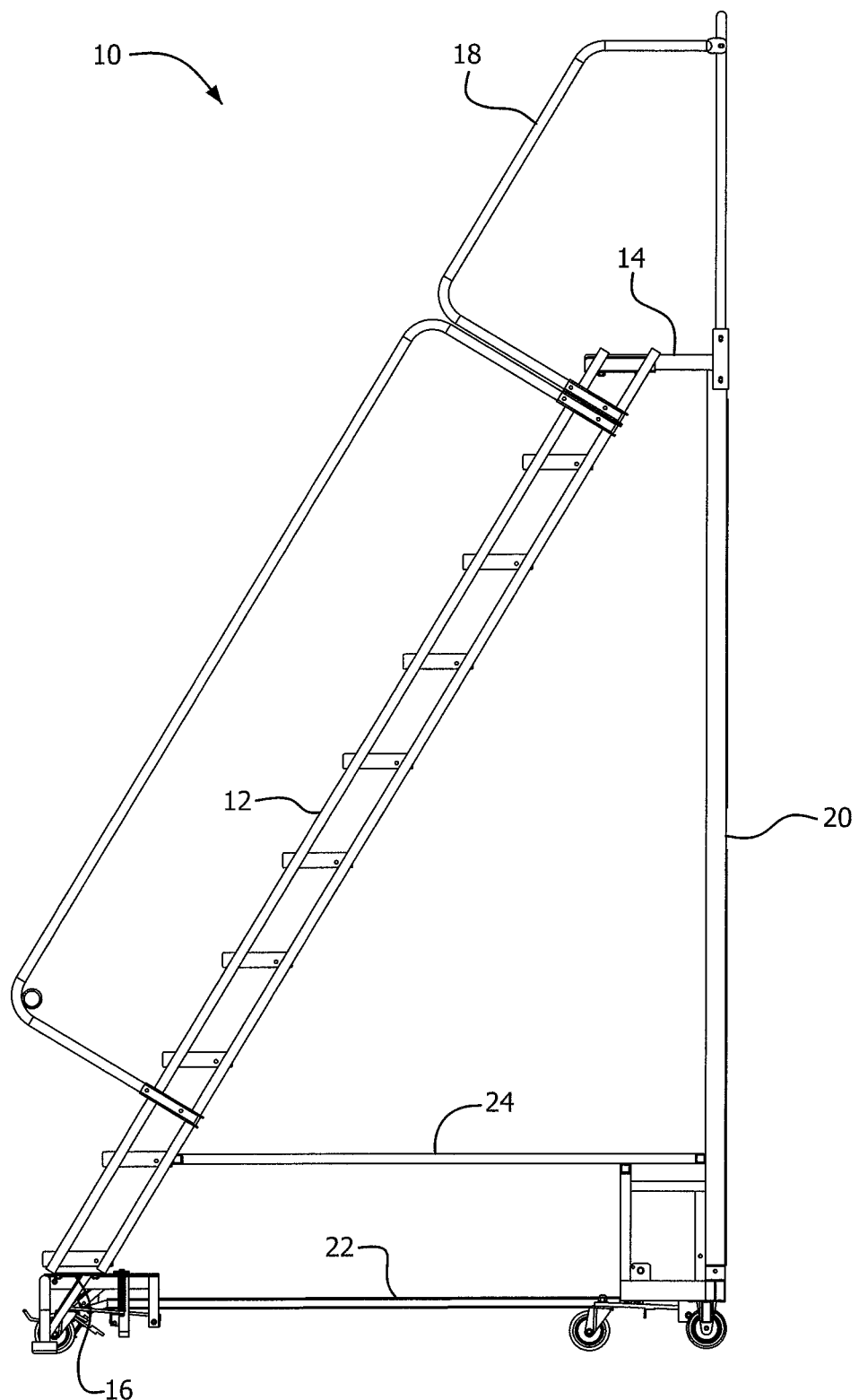
FIG. 2 shows a side view of the ladder according to FIG. 1.
Figure 3:
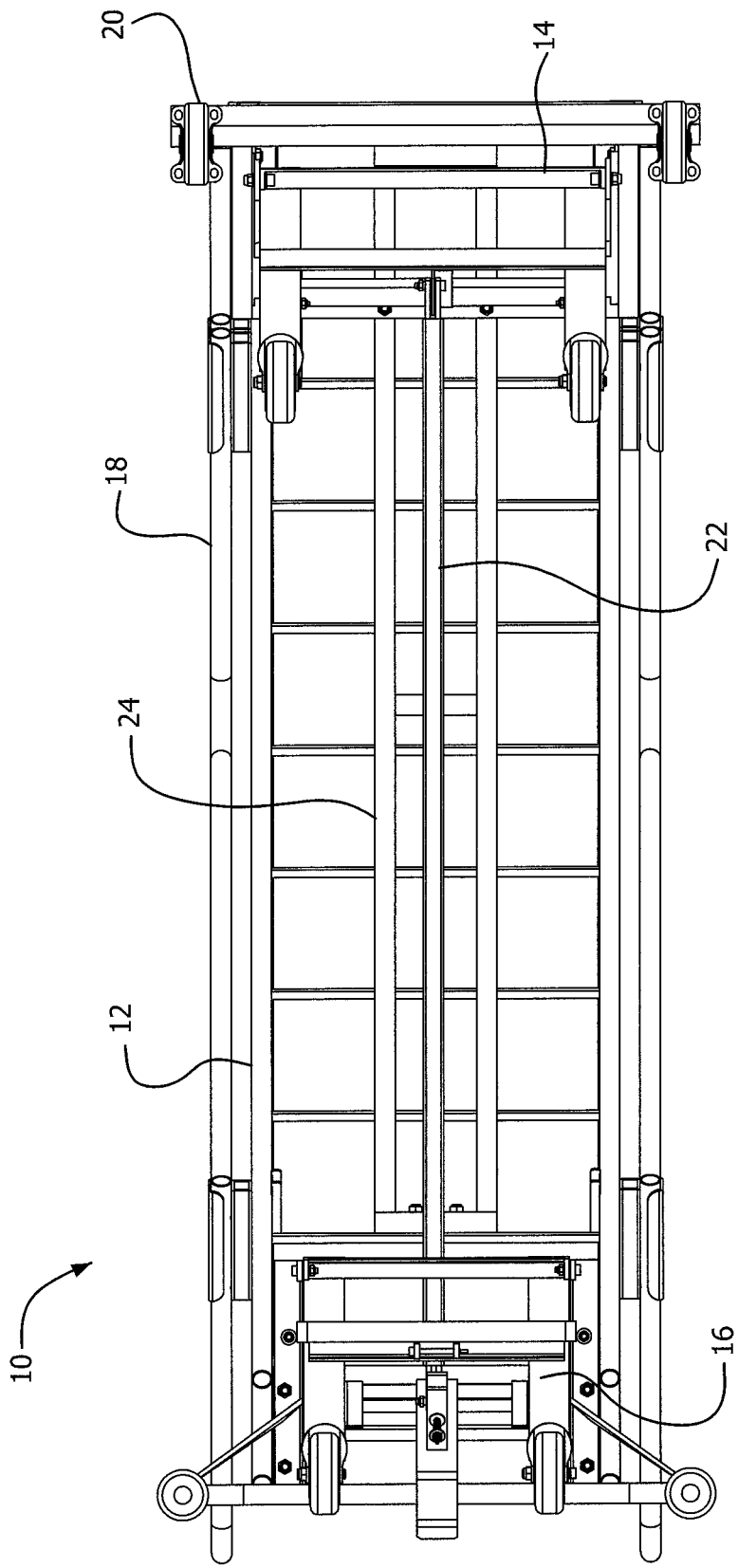
FIG. 3 shows a bottom view of the ladder according to FIG. 1.

Referring now to FIGS. 1-4, there is shown a ladder 10 in accordance with the present invention. The ladder includes a stair section 12 having a plurality of steps including a top step 14 which is typically deeper than the remaining steps and can be made removable during storage to save space in the shipping container.

The ladder 10 may include a lock step assembly 16 for the bottom step which permits the ladder to be selectively rolled when the lock step 16 is in the raised position and secured against rolling when the lock step 16 is in the lowered position. The lock step is connected to a rear pair of wheels via linkage 22. When lowered these four wheels allow the ladder to be wheeled about.

The ladder 10 includes top and side rails 18 for the safety of the user.

The ladder also includes a rear vertical or vertical assembly 20 which attaches to or near the top step 14 such as via a bracket located at the rear of the top step 14. The vertical assembly 20, having upright members 62, attaches to bottom cross bars 54, 56 which attach to a pair of rear wheels to facilitate the positioning of the ladder 10. A cross brace 64 can be used to stabilize the vertical assembly by connecting upright members 62.

Figure 4:
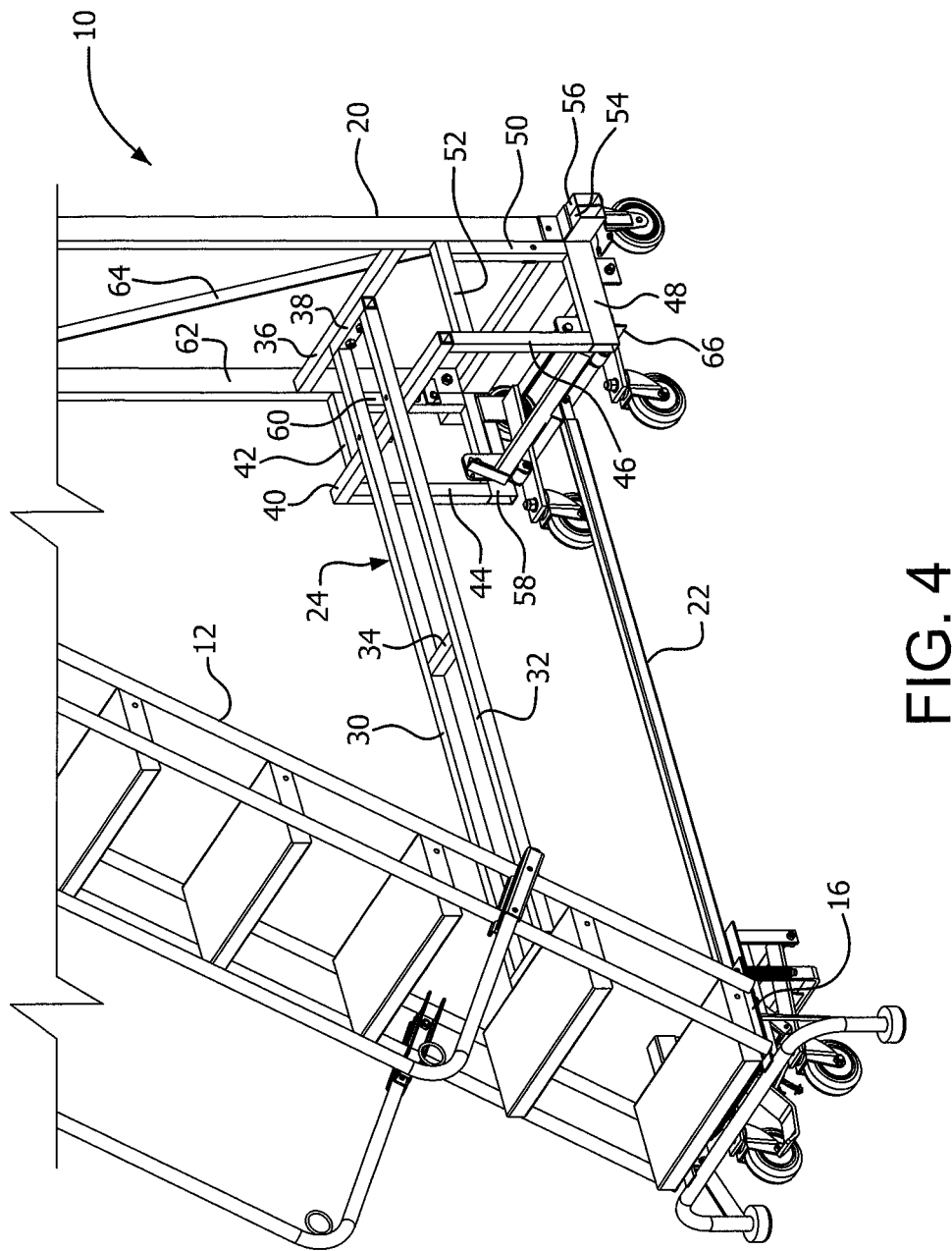
FIG. 4 shows a partial enlarged isometric view of the ladder according to FIG. 1.

The rear portion of the lock step is defined by members 40, 42, 44, 46, 48, 50, 52, 58, and 60 which are interconnected, preferably by welding, though it should be understood that other types of connections fall within the scope of the invention, The ladder 10 may also include an elongated base member 24 located above member 22. The base member 24 may comprise bars 30, 32 connected by cross bars 34. As best seen in FIG. 4, the base member 24 connects to one of the steps above the bottom step or lock step 16 and attaches to the rear of the ladder via a cross bar 38 that attaches to cross bar 36 that extends between the uprights 62 of the vertical upright 20 and to cross bar 40 of the rear wheel base. The base member 24 is preferably a welded rectangle that bolts rigidly between the second step and the vertical 36 providing the ladder 10 with stability in a narrow cross section. As such, the narrow base is much narrower than on standard ladders. In this specific case it is 6" wide instead of the full width of the ladder which would be 24" wide, though it should be understood that other reduced widths might also work depending upon such factors as the size of the aisles, workspaces, obstacles, and the like. This allows the ladder to be maneuvered around obstacles in the workspace such as shelving in a retail store application.

The ladder 10 provides maneuverability around objects in a congested environment. In its traveling position the ladder 10 travels on four caster wheels allowing it to roll in any direction. The narrow base, including base member 24, allows the ladder to turn sharp corners around objects that can protrude partially under the ladder. In particular, the design allows the ladder 10 to be maneuvered around narrow aisle ends in a retail store environment. The base member 24 of the ladder 10 permits the ladder 10 to turn about an obstruction, such as a display case in a store, with a reduced turning radius. This enables the aisles of the store to be located closer together and enabling a more efficient and denser use of the available space of a building, such as a warehouse or a store. And, still permitting the use of rolling ladders within the building.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A ladder comprising:
    an inclined stair section having a plurality of steps, a vertical upright that connects to a top of the stair section, the vertical upright not having steps, one or more wheels connected to the bottom of the vertical upright, the stair section having a predetermined width;
    a movable linkage disposed along a bottom of the ladder and extending substantially horizontally between and operatively connecting a front locking step to a rear wheel assembly; and
    a narrow base extending between and being directly connected to both a step of the stair section above the front locking step and the vertical upright, the narrow base having a predetermined width less than the predetermined width of the stair section, and wherein the narrow base is fixedly attached to and non-movable with respect to both the inclined stair section and a vertical upright.

2. The ladder according to claim 1 wherein the narrow base is an elongated base member located on about the centerline of the ladder.

3. The ladder according to claim 2 wherein the elongated base member comprises a rectangular assembly connected together.

4. The ladder according to claim 2 wherein the step that the elongated base member connects directly to is the second step of the stair assembly, and wherein the elongated base member extends substantially horizontally toward the rear of the ladder.

5. The ladder according to claim 3 wherein the step that the elongated base member connects directly to is the second step of the stair assembly, and wherein the elongated base member extends substantially horizontally toward the rear of the ladder.

6. The ladder according to claim 4 wherein the elongated base member has a width of no more than six inches.

7. The ladder according to claim 5 wherein the elongated base member has a width of no more than six inches.

8. The ladder according to claim 1 wherein a topmost step of the stair section has a length, the steps below the top step having a length that is less than the length of the top step, the top step being connected directly to the vertical upright.

* * * * *